US012299700B2

(12) United States Patent
Radcliffe

(10) Patent No.: US 12,299,700 B2
(45) Date of Patent: May 13, 2025

(54) SYSTEM AND METHOD FOR MACHINE LEARNING BASED GENERATION OF MEDIA STRUCTURED PRODUCTS

(71) Applicant: Isoquant Media, LLC, Brighton, MA (US)

(72) Inventor: Matthew C. Radcliffe, Brighton, MA (US)

(73) Assignee: Isoquant Media, LLC, Boston, MA (US)

( * ) Notice: Subject to any disclaimer, the term of this patent is extended or adjusted under 35 U.S.C. 154(b) by 0 days.

(21) Appl. No.: 15/972,642

(22) Filed: May 7, 2018

(65) Prior Publication Data

US 2018/0336577 A1 Nov. 22, 2018

Related U.S. Application Data

(60) Provisional application No. 62/507,972, filed on May 18, 2017.

(51) Int. Cl.
| | | |
|---|---|---|
| *G06Q 30/0201* | (2023.01) | |
| *G06N 20/00* | (2019.01) | |
| *G06N 20/10* | (2019.01) | |
| G06N 3/02 | (2006.01) | |
| G06N 5/01 | (2023.01) | |

(Continued)

(52) U.S. Cl.
CPC ......... *G06Q 30/0201* (2013.01); *G06N 20/00* (2019.01); *G06N 20/10* (2019.01); *G06N 3/02* (2013.01); *G06N 5/01* (2023.01); *G06N 5/025* (2013.01); *G06N 7/01* (2023.01)

(58) Field of Classification Search
CPC ................................................. G06Q 30/0201
See application file for complete search history.

(56) References Cited

U.S. PATENT DOCUMENTS

| 8,732,023 B2 * | 5/2014 | Mikurak | G06Q 30/0269 |
| | | | 705/22 |
| 9,031,888 B2 * | 5/2015 | Lawrence | G06N 5/022 |
| | | | 706/46 |

(Continued)

OTHER PUBLICATIONS

International Search Report and Written Opinion of the International Searching Authority issued in PCT Application Serial No. PCT/US2018/031373 on Jul. 20, 2018.

(Continued)

*Primary Examiner* — Azam A Ansari
(74) *Attorney, Agent, or Firm* — Jordan IP Law, LLC; Michael T. Abramson

(57) ABSTRACT

A method, computer program product, and computer system for identifying, by a computing device, event specific data of a past media program. A size of delivery of a future media program may be predicted based upon, at least in part, the event specific data of the past media program. A financial media product may be generated based upon, at least in part, the predicted size of delivery of the future media program. An actual size of delivery may be identified. A first action may be executed if the actual size of delivery is greater than the predicted size of delivery based upon, at least in part, the financial media product. A second action may be executed if the actual size of delivery is less than the predicted size of delivery based upon, at least in part, the financial media product.

20 Claims, 13 Drawing Sheets

(51) Int. Cl.
   *G06N 5/025*          (2023.01)
   *G06N 7/01*           (2023.01)

(56) References Cited

U.S. PATENT DOCUMENTS

| | | |
|---|---|---|
| 2006/0212900 A1 | 9/2006 | Ismail et al. |
| 2008/0294607 A1* | 11/2008 | Partovi .................. G06Q 30/00 |
| 2008/0294807 A1 | 11/2008 | Partovi et al. |
| 2010/0251290 A1 | 9/2010 | Kodialam et al. |
| 2012/0023522 A1* | 1/2012 | Anderson ............ H04H 20/106 |
| | | 725/35 |
| 2015/0121418 A1 | 4/2015 | Jain et al. |
| 2015/0134371 A1* | 5/2015 | Shivakumar .......... G06F 16/954 |
| | | 705/5 |
| 2015/0234954 A1* | 8/2015 | Samuel .................. E21B 44/00 |
| | | 703/2 |
| 2017/0070759 A1* | 3/2017 | Flatt ..................... H04N 21/252 |
| 2018/0144380 A1* | 5/2018 | Herken ................ G06Q 10/107 |
| 2018/0204263 A1* | 7/2018 | Buezas .............. G06Q 30/0619 |

OTHER PUBLICATIONS

Lantz, B. (2013). "Machine Learning with R". Birmingham, UK: Packt Publishing.

Media Math, NTC Publishing. (Mar. 3, 2017). "Media Planning & Buying Calculators". Retrieved from Kantar Media SRDS Media Planning Platform: https://www.srds.com/frontMatter/sup-serv/calulator/grp_trp/grps_trps.html.

* cited by examiner

| Type of Event | Episodic | Stand Alone |
|---|---|---|
| Sports | Regular season games | Olympics, World Cup, March Madness, playoffs, championship series/game |
| News | Nightly news (local & national), entertainment news, news magazines | Special reports, breaking news coverage, exclusive interviews |
| Award Shows | | Oscars, Grammys, AMAs, Tony Awards, CMAs, Golden Globes, ESPYs |
| New Series | Premier season of any broadcast or cable show | Holiday specials, music specials/concerts, live performances, parades |

ARIMA (16,1,1)(1,1,1)[8] Output

| # Overall | # in Season | Forecast | Lo 95 | Hi 95 | Std. Dev. |
|---|---|---|---|---|---|
| 100 | 1 | 11.942028 | 10.559887 | 13.324170 | 0.6930 |
| 101 | 2 | 10.133176 | 8.550143 | 11.716210 | 0.7937 |
| 102 | 3 | 8.945481 | 7.021895 | 10.869070 | 0.9645 |
| 103 | 4 | 8.984983 | 6.924460 | 11.045510 | 1.0331 |
| 104 | 5 | 8.690452 | 6.490001 | 10.890900 | 1.1033 |
| 105 | 6 | 8.168895 | 5.935218 | 10.402570 | 1.1199 |
| 106 | 7 | 8.019631 | 5.741563 | 10.297700 | 1.1422 |
| 107 | 8 | 8.711579 | 6.234676 | 11.188480 | 1.2419 |
| 108 | 9 | 9.950047 | 7.257534 | 12.642560 | 1.3500 |
| 109 | 10 | 8.200835 | 5.435088 | 10.966580 | 1.3867 |
| 110 | 11 | 7.716632 | 4.853694 | 10.579570 | 1.4354 |
| 111 | 12 | 8.019844 | 5.069207 | 10.970480 | 1.4794 |
| 112 | 13 | 7.916345 | 4.884246 | 10.948440 | 1.5203 |
| 113 | 14 | 7.389081 | 4.237988 | 10.540170 | 1.5799 |
| 114 | 15 | 7.250413 | 3.912949 | 10.587880 | 1.6734 |
| 115 | 16 | 8.022974 | 4.374814 | 11.671130 | 1.8291 |

Observations 99
Confidence Level 95%
t-Statistic 1.9845

INPUT

| | |
|---|---|
| Contract Signed | 4/21/2017 |
| Air Date | 10/22/2017 |
| Episode # | 1 |
| Contract Viewership | 13,000,000 |
| Campaign Budget | $ 500,000 |
| Expected Viewership | 11,942,028 |
| Expected Standard Deviation | 692,989 |
| % Deductible | -5% |
| % Under-Delivery Limit | -30% |
| Target Loss Ratio | 50% |

OUTPUT

| | |
|---|---|
| Days Until Contract Start | 184 |
| Days Until Contract Payout | 187 |
| CPM | $ 38.46 |
| Deductible | 12,350,000 |
| Under-Delivery Limit | 9,100,000 |
| Maximum Exposure | $ 125,000 |
| Maximum Loss Ratio | 308.42% |
| Expected Loss | $ 20,265 |
| Discount Factor | 1.0106 |

| | |
|---|---|
| Premium | $ 40,104 |
| Premium as % of Campaign | 8.11% |

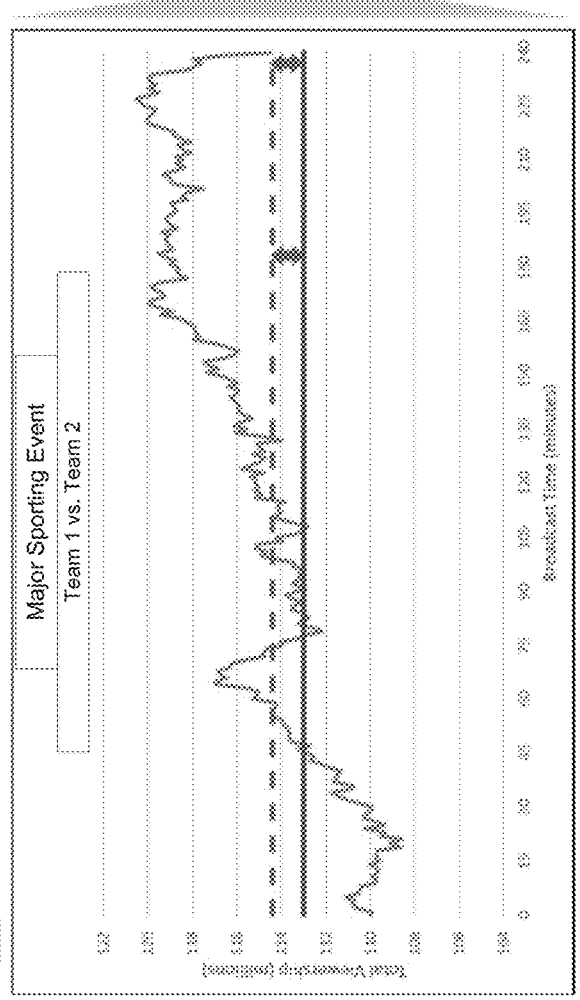
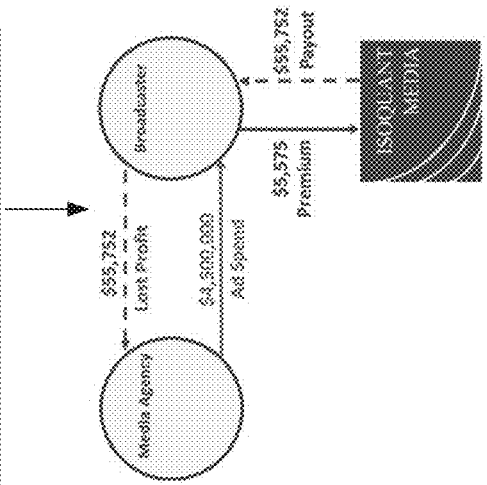
FIG. 9

FIG. 11

SYSTEM AND METHOD FOR MACHINE LEARNING BASED GENERATION OF MEDIA STRUCTURED PRODUCTS

RELATED CASES

This application claims the benefit of U.S. Provisional Application No. 62/507,972, filed on 18 May 2017, the contents of which are all incorporated by reference.

BACKGROUND

In the past, media (e.g., television and/or radio) were essentially the only mediums used to receive "broadcast" based entertainment (e.g., sports, television shows, movies, etc.). Today, there are many alternative mediums to receive such entertainment, which may also be streamed via smartphones and websites (among others).

BRIEF SUMMARY OF DISCLOSURE

In one example implementation, a method, performed by one or more computing devices, may include but is not limited to identifying, by a computing device, event specific data of a past media program. A size of delivery of a future media program may be predicted based upon, at least in part, the event specific data of the past media program. A financial media product may be generated based upon, at least in part, the predicted size of delivery of the future media program. An actual size of delivery may be identified. A first action may be executed if the actual size of delivery is greater than the predicted size of delivery based upon, at least in part, the financial media product. A second action may be executed if the actual size of delivery is less than the predicted size of delivery based upon, at least in part, the financial media product.

One or more of the following example features may be included. Identifying may include obtaining at least a portion of the event specific data via an internal data feed. Identifying may include obtaining at least a portion of the event specific data via web scraping executed using a scripting language. Predicting the size of delivery of the media program may include executing one or more quantitative models using the event specific data. The one or more quantitative models may include at least one of a time series model and a machine learning model. The financial media product may be based upon, at least in part, one of a type of media product and a type of event. The financial media product may be based upon, at least in part, a supplier of the future media program.

In another example implementation, a computing system may include one or more processors and one or more memories configured to perform operations that may include but are not limited to identifying event specific data of a past media program. A size of delivery of a future media program may be predicted based upon, at least in part, the event specific data of the past media program. A financial media product may be generated based upon, at least in part, the predicted size of delivery of the future media program. An actual size of delivery may be identified. A first action may be executed if the actual size of delivery is greater than the predicted size of delivery based upon, at least in part, the financial media product. A second action may be executed if the actual size of delivery is less than the predicted size of delivery based upon, at least in part, the financial media product.

One or more of the following example features may be included. Identifying may include obtaining at least a portion of the event specific data via an internal data feed. Identifying may include obtaining at least a portion of the event specific data via web scraping executed using a scripting language. Predicting the size of delivery of the media program may include executing one or more quantitative models using the event specific data. The one or more quantitative models may include at least one of a time series model and a machine learning model. The financial media product may be based upon, at least in part, one of a type of media product and a type of event. The financial media product may be based upon, at least in part, a supplier of the future media program.

In another example implementation, a computer program product may reside on a computer readable storage medium having a plurality of instructions stored thereon which, when executed across one or more processors, may cause at least a portion of the one or more processors to perform operations that may include but are not limited to identifying event specific data of a past media program. A size of delivery of a future media program may be predicted based upon, at least in part, the event specific data of the past media program. A financial media product may be generated based upon, at least in part, the predicted size of delivery of the future media program. An actual size of delivery may be identified. A first action may be executed if the actual size of delivery is greater than the predicted size of delivery based upon, at least in part, the financial media product. A second action may be executed if the actual size of delivery is less than the predicted size of delivery based upon, at least in part, the financial media product.

One or more of the following example features may be included. Identifying may include obtaining at least a portion of the event specific data via an internal data feed. Identifying may include obtaining at least a portion of the event specific data via web scraping executed using a scripting language. Predicting the size of delivery of the media program may include executing one or more quantitative models using the event specific data. The one or more quantitative models may include at least one of a time series model and a machine learning model. The financial media product may be based upon, at least in part, one of a type of media product and a type of event. The financial media product may be based upon, at least in part, a supplier of the future media program.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4 is an example diagrammatic view of an example model classification chart displayed by a delivery process according to one or more example implementations of the disclosure;

FIG. 5 is an example diagrammatic view of an example autoregressive integrated moving average (ARIMA) model displayed by a delivery process according to one or more example implementations of the disclosure;

FIG. 7 is an example diagrammatic view of example terms displayed by a delivery process according to one or more example implementations of the disclosure;

FIG. 9 is an example diagrammatic view of an example upside protection chart displayed by a delivery process according to one or more example implementations of the disclosure;

FIG. 11 is an example diagrammatic view of example structured media product deal parameters displayed by a delivery process according to one or more example implementations of the disclosure;

Like reference symbols in the various drawings indicate like elements.

DETAILED DESCRIPTION

Figure 1:
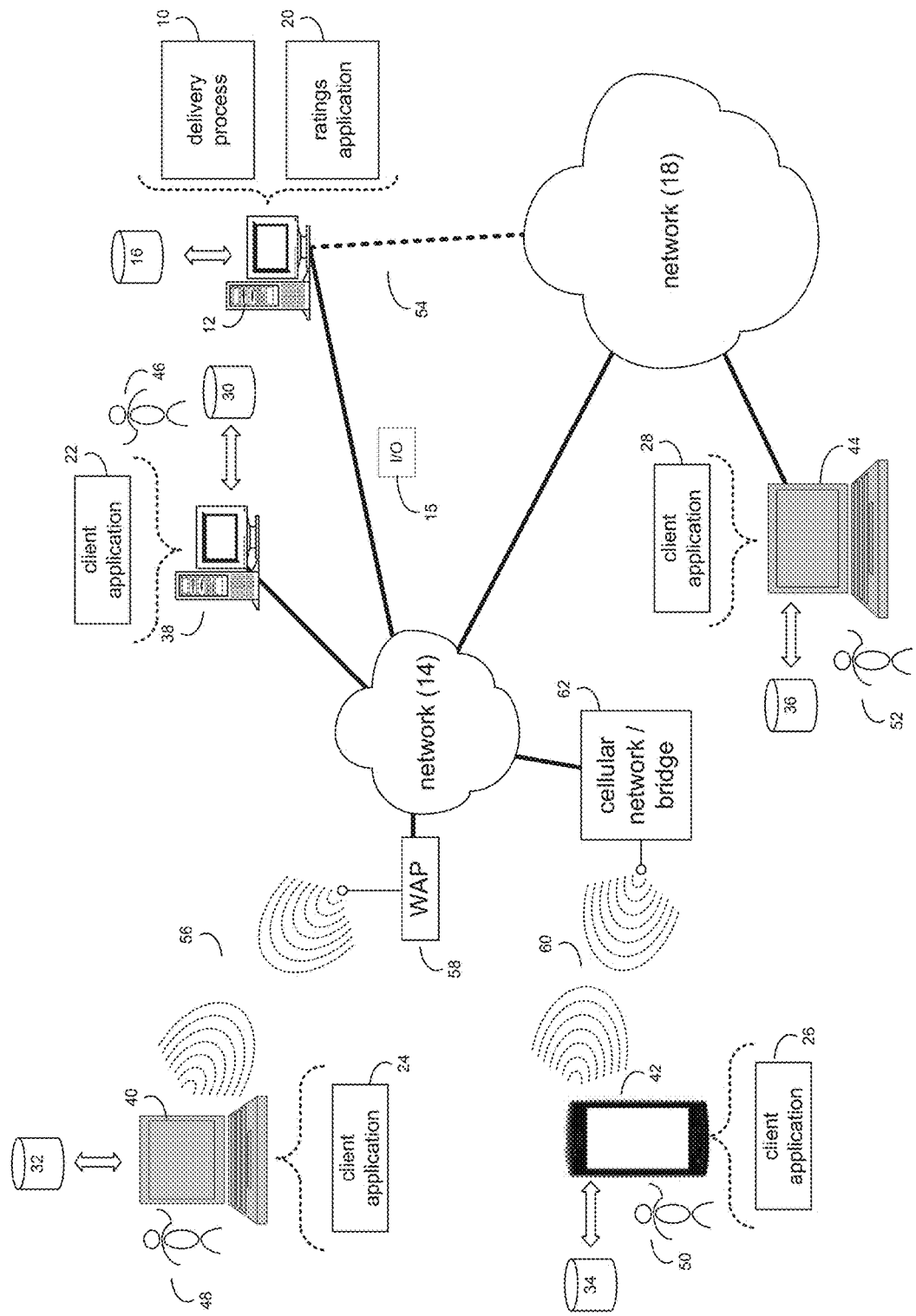
FIG. 1 is an example diagrammatic view of a delivery process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown delivery process 10 that may reside on and may be executed by a computer (e.g., computer 12), which may be connected to a network (e.g., network 14) (e.g., the interne or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a delivery process, such as delivery process 10 of FIG. 1, may identifying, by a computing device, event specific data of a past media program. A size of delivery of a future media program may be predicted based upon, at least in part, the event specific data of the past media program. A financial media product may be generated based upon, at least in part, the predicted size of delivery of the future media program. An actual size of delivery may be identified. A first action may be executed if the actual size of delivery is greater than the predicted size of delivery based upon, at least in part, the financial media product. A second action may be executed if the actual size of delivery is less than the predicted size of delivery based upon, at least in part, the financial media product.

In some implementations, the instruction sets and sub-routines of delivery process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, delivery process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a ratings application (e.g., ratings application 20), examples of which may include, but are not limited to, e.g., a third party data provider application (e.g., Nielsen, Comscore, social media aggregators, etc.), a social media application, a website application (e.g., Ad Age, Media Post, Sports Media Watch, Variety, etc.), a web scraping application, a client application (e.g., internal data feeds, spreadsheets, etc.), or other application that allows for obtaining or identifying historical and/or current delivery data. In some implementations, delivery process 10 and/or ratings application 20 may be accessed via one or more of client applications 22, 24, 26, 28. In some implementations, delivery process 10 may be a standalone application, or may be an applet/application/script/extension that may interact with and/or be executed within ratings application 20, a component of ratings application 20, and/or one or more of client applications 22, 24, 26, 28. In some implementations, ratings application 20 may be a standalone application, or may be an applet/application/script/extension that may interact with and/or be executed within delivery process 10, a component of delivery process 10, and/or one or more of client applications 22, 24, 26, 28. In some implementations, one or more of client applications 22, 24, 26, 28 may be a standalone application, or may be an applet/application/script/ extension that may interact with and/or be executed within and/or be a component of delivery process 10 and/or ratings application 20. Examples of client applications 22, 24, 26, 28 may include, but are not limited to, e.g., a third party data provider application (e.g., Nielsen, Comscore, social media aggregators, etc.), a social media application, a website application (e.g., Ad Age, Media Post, Sports Media Watch, Variety, etc.), a web scraping application, a client application (e.g., internal data feeds, spreadsheets, etc.), or other application that allows for obtaining or identifying historical and/or current delivery data, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of delivery process 10 (and vice versa). Accordingly, in some implementations, delivery process 10 may be a purely server-side application, a purely client-side application, or a hybrid server-side/client-side application that is cooperatively executed by one or more of client applications 22, 24, 26, 28 and/or delivery process 10.

In some implementations, one or more of client applications 22, 24, 26, 28 may be configured to effectuate some or all of the functionality of ratings application 20 (and vice versa). Accordingly, in some implementations, ratings application 20 may be a purely server-side application, a purely client-side application, or a hybrid server-side/client-side application that is cooperatively executed by one or more of client applications 22, 24, 26, 28 and/or ratings application 20. As one or more of client applications 22, 24, 26, 28, delivery process 10, and ratings application 20, taken singly or in any combination, may effectuate some or all of the same functionality, any description of effectuating such functionality via one or more of client applications 22, 24, 26, 28, delivery process 10, ratings application 20, or combination thereof, and any described interaction(s) between one or more of client applications 22, 24, 26, 28, delivery process 10, ratings application 20, or combination thereof to effectuate such functionality, should be taken as an example only and not to limit the scope of the disclosure.

In some implementations, one or more of users 46, 48, 50, 52 may access computer 12 and delivery process 10 (e.g., using one or more of client electronic devices 38, 40, 42, 44) directly through network 14 or through secondary network 18. Further, computer 12 may be connected to network 14 through secondary network 18, as illustrated with phantom link line 54. Delivery process 10 may include one or more user interfaces, such as browsers and textual or graphical user interfaces, through which users 46, 48, 50, 52 may access delivery process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
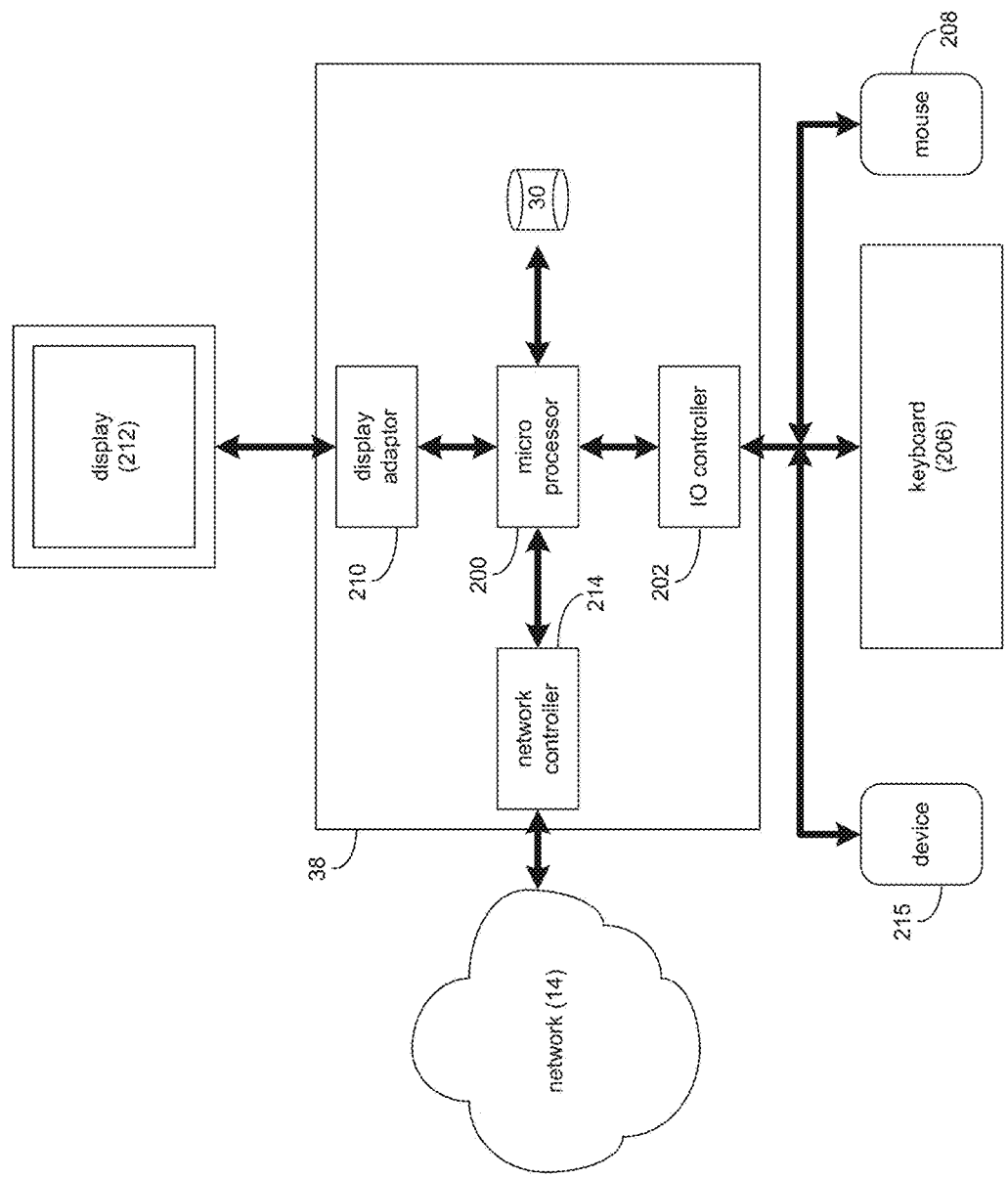
FIG. 2 is an example diagrammatic view of a computer of FIG. 1 according to one or more example implementations of the disclosure.
Figure 3:
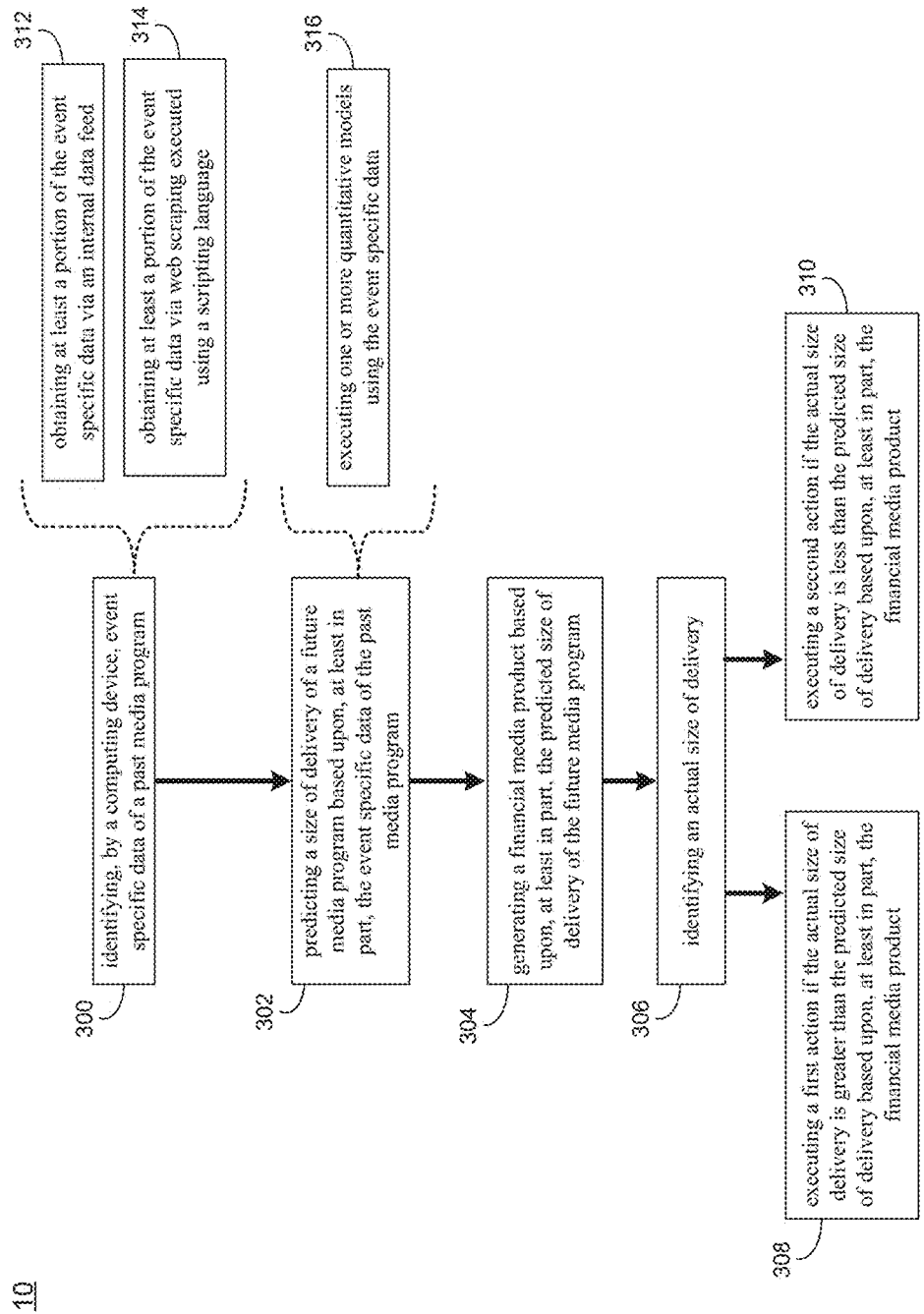
FIG. 3 is an example flowchart of a delivery process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, delivery process 10 may be substituted for client electronic device 38 (in whole or in part) within FIG. 2, examples of which may include but are not limited to computer 12 and/or one or more of client electronic devices 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, delivery process 10 may at least help, e.g., improve financial and structured media product technology processes, which are necessarily rooted in computer technology in order to overcome an example and non-limiting problem specifically arising in the realm of machine learning based generation of financial and structured media products). It will be appreciated that the computer processes described throughout are not considered to be well-understood, routine, and conventional functions.

The Delivery Process:

As discussed above and referring also at least to the example implementations of FIGS. 3-13, delivery process 10 may identify 300, by a computing device, event specific data of a past media program. Delivery process 10 may predict 302 a size of delivery of a future media program based upon, at least in part, the event specific data of the past media program. Delivery process 10 may generate 304 a financial or structured media product based upon, at least in part, the predicted size of delivery of the future media program. Delivery process 10 may identify 306 an actual size of delivery. Delivery process 10 may execute 308 a first action if the actual size of delivery is greater than the predicted size of delivery based upon, at least in part, the financial media product. Delivery process 10 may execute 310 a second action if the actual size of delivery is less than the predicted size of delivery based upon, at least in part, the financial media product.

As will be discussed in greater detail below, delivery may generally be described as, e.g., viewership, ratings, gross ratings points (GRPs), digital impressions, out-of-home impressions (including billboards, aerial advertising, brochures, bus stops, commuter rail displays, posters, taxi signs, athletic fields and parks, etc.), listeners, clicks, click-through rate (CTR), leads, readership, subscribers, etc. that an advertising campaign generates over its term. As will also be discussed in greater detail below, contract guarantee may generally be described as, e.g., a delivery level (threshold) that a media supplier guarantees a media buyer over the course of a given advertising campaign. As will also be discussed in greater detail below, cost per thousand (CPM) may generally be described as, e.g., a metric in which advertising contracts may be quoted, e.g.:

$$\text{Cost per Thousand }(CPM) = \frac{\text{Advertising Campaign Cost}}{\text{Contract Delivery}/1{,}000}$$

As will also be discussed in greater detail below, effective cost per thousand (eCPM) may generally be described as, e.g., a metric in which campaign performance may be quoted, e.g.:

$$\text{Effective Cost per Thousand }(eCPM) = \frac{\text{Advertising Campaign Cost}}{\text{Actual Delivery}/1{,}000}$$

As will also be discussed in greater detail below, a make good may generally be described as, e.g., the dollar value that a media supplier owes to a media buyer contingent on under-delivery on a given advertising campaign. Make goods are generally also known as Audience Deficiency Units (ADUs) in television and Added Value Units in digital and radio media, e.g.:

Make Good=Max{0,Contract Delivery−Actual Delivery}×CPM

As will also be discussed in greater detail below, a deductible may generally be described as, e.g., the amount of the loss not covered under a policy, which may be determined based on one or more example factors, e.g., (1) the difference between the contract guarantee and the expected delivery from a forecast model of delivery process 10, and/or (2) the variance of expected delivery, where the greater the variance, the higher the deductible, and vice versa.

As will also be discussed in greater detail below, a policy limit may generally be described as, e.g., the maximum loss amount covered under a policy. As will also be discussed in greater detail below, a policy premium may generally be described as, e.g., the expected payout of a policy divided by the target loss ratio, e.g.:

$$\text{Premium} = \frac{\text{Expected Payout}}{\text{Target Loss Ratio}} = \frac{\int_d^u [1 - F_x(x)]dx}{R_T}$$

where u=limit
d=deductible
$F_x(x)$=cumulative distribution function (CDF) of loss variable X
$R_T$=target loss ratio As will also be discussed in greater detail below, a claim payment may generally be described as, e.g., the dollar value of the under-delivery subject to the deductible and limit, e.g.:

$$\text{Claim Payment} = \begin{cases} 0 & \text{if } X \leq d \\ X - d & \text{if } d < X \leq u \\ u - d & \text{if } X > u \end{cases}$$

where the payment process may be triggered when actual delivery is less than the contract guarantee.

In some implementations, and shown by the example model classification chart 400 in FIG. 4, delivery process 10 may generate pre-built models that may be classified by genre (e.g., family sitcoms, crime dramas, evening news, sports, etc.), by media type (e.g., TV, digital, radio, etc.), and/or by type of event (e.g., episodic or stand-alone). Example pre-built models generated by delivery process 10 may serve as the "base" for all future predictive models.

The following describes an example policy pricing detail of an Under-Delivery Protection Policy for Apr. 6, 2017: XYZ Network's Upfront Presentation. For instance, assume for example purposes only that company A wants to advertise its 2018 model truck and believes that the TV show "WD" viewership base represents a large portion of company A's target market. Company A buys one 30-second commercial during the season 8 premier of "WD" for, e.g., $500,000. In return, XYZ Network guarantees company A that, e.g., 13 million viewers will see its commercial, an example CPM of $38.46. However, company A is very concerned about the steady decline in viewership the show experienced over the second half of season 7. Company A understands that if the season 8 premier significantly underdelivers, company A will have to wait months for its make good along with dozens of other advertisers. In the example, company A may rather receive cash immediately so that it may redeploy across other media channels to optimize its advertising reach.

Further in the example, assume that on Apr. 12, 2017, that XYZ Network wants to keep company A, one of its largest advertisers, happy during the upcoming media season. XYZ Network is also concerned about the decline in viewership the show recently experienced and wants to protect itself against under-delivery during the season 8 premier when CPMs (and potential make goods) are at their greatest. XYZ Network may use the benefits of delivery process 10 to protect itself (e.g., via purchasing a delivery risk insurance policy). In some implementation, delivery process 10 may transmit and display (e.g., via client computing device 38) a customer questionnaire with XYZ Network to understand the general terms and purpose of the policy. Some example questions may include, e.g.: what type of media do you want to insure against? How long of a policy term is the coverage? What event(s) do you want to insure against? What metric(s) do you want to insure against? Do you want a stand-alone or episodic policy? What data will act as the trigger event?

In some implementations, delivery process 10 may identify 300, by a computing device, event specific data of a past media program, and delivery process 10 may predict 302 a size of delivery of a future media program based upon, at least in part, the event specific data of the past media program. For instance, further in the example, assume that on Apr. 14, 2017, delivery process 10 forecasts (predicts) viewership for the season 8 premier and begins the prediction analysis using one or more of the above-noted pre-built base model(s) for the TV Horror genre. In the example, the base model (via delivery process 10) may aim to understand the common factors that drive viewership levels across all shows within the genre across the different networks. For example, how have similar shows to "WD" performed over the last several years when compared to similar genres of different shows on different networks? Event specific data of "WD" may then be layered on to the base model, which may include, e.g.: historical viewership data (which may serve as the starting point of a time series model generated by delivery process 10), competitor shows during the same time block (e.g., how did episodes of "WD" during the first half of each season go up against a popular sporting event on another network), performance of the "Lead-In" (e.g., a popular show with a large viewership base that airs right before "WD" may have a positive impact on "WD" viewership), social media data (e.g., social media activity or "event buzz" may be a strong predictor of season premier and season finale performance), and/or weather data (e.g., bad weather may cause people to stay in and watch TV while sunny days may draw people outside rather than watch TV).

In some implementations, identifying 300 may include obtaining 312 at least a portion of the event specific data via an internal data feed, and in some implementations, identifying 300 may include obtaining 314 at least a portion of the event specific data via web scraping executed using a scripting language. For instance, the above-noted event specific data may be collected (obtained) from various sources, including delivery process 10, third-party data providers via delivery process 10 (e.g., Nielsen, Comscore, social media aggregators, etc.), websites via delivery process 10 (e.g., Ad Age, Media Post, Sports Media Watch, Variety, etc.), and clients via delivery process 10 (e.g., internal data feeds, etc.). In some implementations, third-party data may be collected either through "data dumps," which usually consist of daily, weekly, or monthly spreadsheet downloads, or through client web portals executed by delivery process 10, which may allow clients to log-in to their accounts and access data anytime. Website data may be collected via delivery process 10 through "web scraping," in which a scripting language such as R, Python, etc. may be used by delivery process 10 to "pull" data from websites or other sources at given time intervals. In some implementations, delivery process 10 may use some or all of this event specific data to be aggregated, managed, and stored in a proprietary database (such as the above-noted data stores) accessible by delivery process 10.

In some implementations, predicting 302 the size of delivery of the media program may include executing 316 one or more quantitative models using the event specific data, and in some implementations, the one or more quantitative models may include at least one of a time series model and a machine learning model. For example, some quantitative models that may be used by delivery process 10 to predict/forecast expected delivery may be classified into two major groups (although others may be used without departing from the scope of the present disclosure), e.g.:
Time Series
   a. Autoregressive Integrated Moving Average (ARIMA)
   b. Vector Autoregression (VAR)
Machine Learning
   a. Supervised Learning Algorithms
     i. Nearest Neighbor
     ii. Naïve Bayes
     iii. Decision Trees
     iv. Classification Rule Learners
     v. Linear Regression
     vi. Regression Trees
     vii. Model Trees
     viii. Neural Networks
     ix. Support Vector Machines
   b. Unsupervised Learning Algorithms
     i. Association Rules
     ii. k-Means Clustering In some implementations, the event specific data from the above-noted data store may be fed by delivery process 10 into one or more of these models, which may then be used by delivery process 10 to forecast the expected delivery and corresponding statistics for the season 8 premier. In some implementations, delivery process 10 may back-test each model and/or may undergo several iterations in order to find the best model "fit." The model with the best "fit" may be selected by delivery process 10 and its output may then be used in the pricing model. Example FIG. 5 shows an example ARIMA model 500 with an output built in R to predict viewership for each episode in season 8 of "WD."

Figure 6:
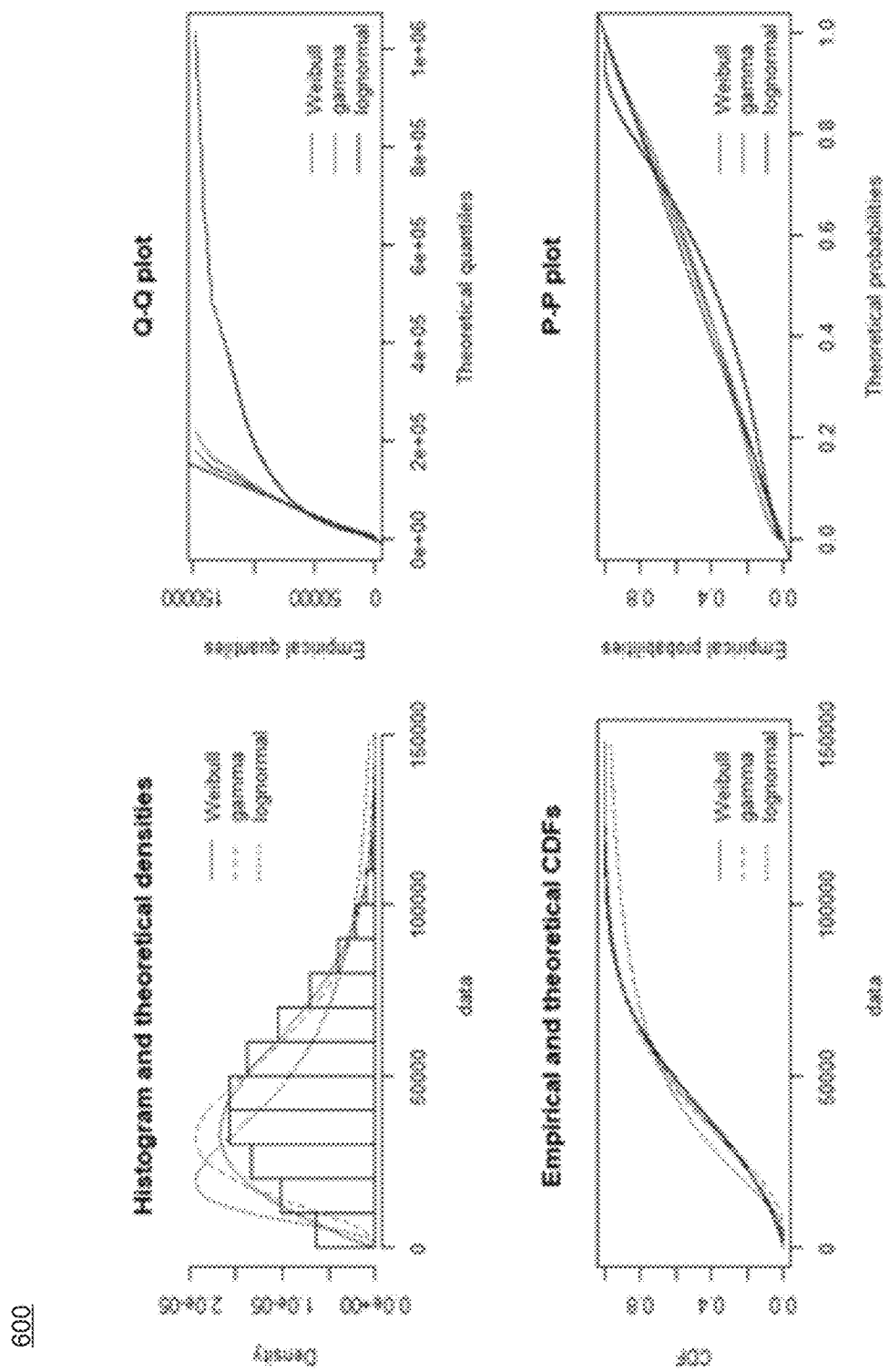
FIG. 6 is an example diagrammatic view of an example output from a loss distribution of a TV show episode displayed by a delivery process according to one or more example implementations of the disclosure.
Figure 8:
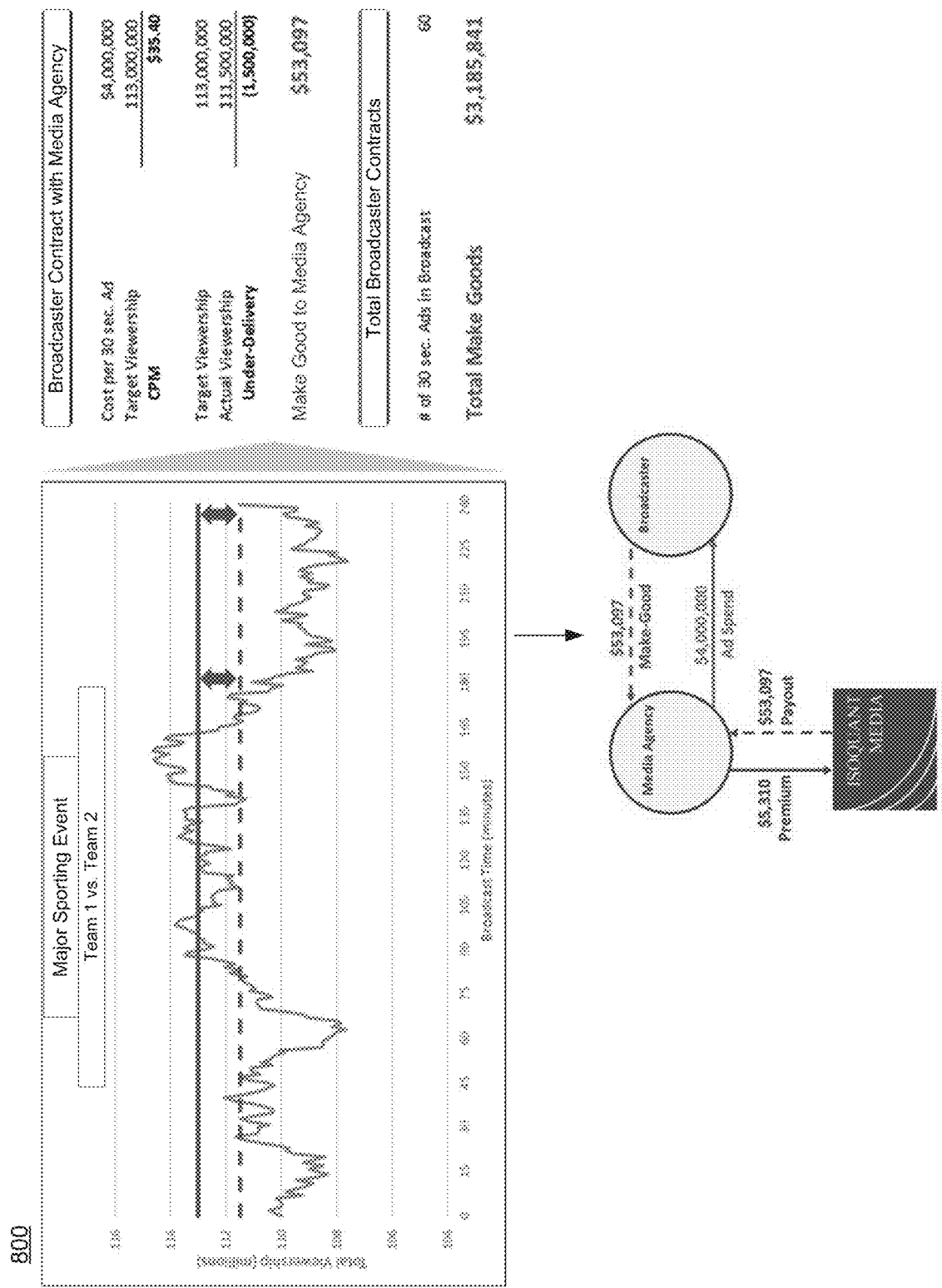
FIG. 8 is an example diagrammatic view of an example downside protection chart displayed by a delivery process according to one or more example implementations of the disclosure.

Further in the example, assume that on Apr. 18, 2017, that the output from the forecast model, particularly the expected delivery mean and variance, is incorporated into the pricing model by delivery process 10, which may use these inputs to generate a distribution of the make good (e.g., the loss distribution). In some implementations, delivery process 10 may generate the loss distribution using one or more models, such as binomial lattice models and Monte Carlo simulations. The model (via delivery process 10) may then apply various curve fitting techniques to fit the loss distribution to a known probability distribution (e.g., Weibull, gamma, lognormal, exponential, etc.) so that statistical tests may be applied to study the risk. Example FIG. 6 show example output 600 from a loss distribution of the season 8 premier of "WD" generated by delivery process 10 using R.

Further in the example, assume that delivery process 10 generates multiple potential policies for XYZ Network (based upon the above-noted event specific data), which may vary based upon, at least in part, the amount of coverage and premium. Further assume that XYZ Network agrees to purchase a policy with the example terms 700 shown in example FIG. 7.

Further in the example, assume that on Oct. 22, 2017, the season 8 premier of "WD" airs at 9:00 PM EST. Further assume that the episode goes up against a popular Sunday night sporting even on another network between two rival teams, which is considered a rematch of last year's major sporting event. Further in the example, assume that on Oct. 24, 2017 Nielsen releases its live+same day ratings for the Sunday night shows, which is obtained by delivery process 10. In the example, the season 8 premier drew only 11.44 million viewers, a 12.0% under-delivery and an eCPM of $43.71. XYZ Network now owes a make good of $60,000 to every advertiser that bought time during the episode. Generally, make goods are accounted for as deferred revenue (a liability line item) on XYZ Network's balance sheet. Further in the example, assume that on Oct. 25, 2017 that the under-delivery triggers a claim payout of $35,000 to be paid to XYZ Network. In the example, delivery process 10 may notify its insurance carrier partner of the claim event which then pays the claim to XYZ Network. Company A is not happy with the significant under-delivery on the episode and threatens to pull its advertising from XYZ Network, where XYZ Network decides to give the $35,000 claim to company A as a sign of goodwill, which reduces its liability owed to company A to $25,000. Company A is extremely happy to receive the cash and can now decide what to do with it (e.g., either keep the cash to improve its marketing return on investment (ROI) or redeploy on another advertising campaign).

The outdated economics and inefficient pricing structure of the media industry may create significant risk between counterparties. For example, contracts between brands, media agencies, television broadcasters, and digital publishers may be grossly mispriced and generate significant liabilities due to, e.g., the under- and over-delivery of contractual viewership, ratings, or digital impressions. As such, brands, media agencies, digital publishers, and broadcasters (as well as others) may not be able to accurately budget advertising spending and revenues, which may place substantial pressure on their cash flows while increasing operational and business risk. Generally, media companies (or other companies) are at the mercy of the unpredictable and idiosyncratic nature of, e.g., consumer viewing habits.

Institutional investors have been chasing yield over the last 15 years in increasingly complex and exotic structured investment products. Generally, these products may often face substantial systemic risk due to the correlation of the returns of the underlying assets to that of the overall market. Furthermore, the underwriters and originators of these products can face substantial liquidity risk during times of market dislocations, which can lead to counterparty payment defaults or insolvency.

The concept of "media risk" may not be known to currently exist. As an example, there currently may be no known risk transfer mechanisms in place between media companies, or with third parties, that may efficiently clear (or reduce) this risk from the system. There currently may be no known financial products that media companies can purchase that offer downside protection from under-delivery or upside participation from over-delivery. There currently may be no known structured products with payoffs, yields, coupon rates, etc. determined by media under- or over-delivery or by financial products with payoffs determined by media under- or over-delivery. Thus, as will be discussed below, the techniques described throughout may enable delivery process 10 to generate an entirely unique type of product (e.g., a financial or structured media product).

For example, the media industry is generally comprised of two major groups, e.g.: (1) media buyers, which are the brands and media agencies (or other type of media buyer), and (2) media suppliers, the digital publishers, television broadcasters and networks, radio stations, newspapers, and magazines (or other type of media supplier). In some implementations, as noted above, media suppliers may guarantee the media buyers a contractual level of media metrics (delivery) (e.g., viewership, ratings, digital impressions, listeners, gross ratings points (GRPs), etc.) in return for a fixed, upfront fee. As noted above, one of two scenarios may then generally occur. The first example scenario may be when the contract metric (delivery) (e.g., viewership, ratings, digital impressions, listeners, GRPs, etc.) is higher than the contractual threshold. In this case, the media buyers "win" since they receive a better-than-expected return on their marketing investment whereas the media suppliers "lose" since they could have charged a higher upfront fee (the higher the expected viewership, ratings, digital impressions, listeners, GRPs, etc., the higher the upfront fee the media suppliers can charge). Due to this asymmetric payoff, media suppliers may have every incentive to over-promise delivery to media buyers since they typically do not profit from unexpected upside, which may create a very inefficient advertising market. The media supplier may have purchased a financial product that provides a payout if the actual contract metric is higher than the contractual contract metric, thereby allowing the media supplier to profit from better-than-expected outcomes. For instance, assume for example purposes only that company X (the media buyer) purchased a 30-second commercial spot from XYZ Network (the media supplier) for $500,000 during "WD." In return, XYZ Network guaranteed company X a total audience of 20 million viewers, for a cost-per-thousand (CPM) of $25.00. If the actual total audience was 22 million viewers (i.e., the actual size of delivery is greater than the predicted size of delivery), company X's effective CPM (eCPM) was $22.72, meaning they spent less per thousand viewers than they had anticipated. On the other hand, XYZ Network is frustrated since it just "left money on the table;" they are capped at $500,000 in revenue and could have charged a higher upfront fee for the larger audience.

The second example scenario may be when the contract metric is lower than the contractual threshold (i.e., the actual size of delivery is less than the predicted size of delivery). In this example, the media buyers "lose" since they receive a lower-than-expected return on their marketing investment, whereas the media suppliers "win" since they received more money upfront than was warranted. However, the media supplier must somehow "make good" the media buyer to satisfy the terms of the contract. To do so, media suppliers give away free blocks of inventory, also known as audience deficiency units (ADUs), added value units, or true-ups, at some point in the future to the media buyers. The value of these free blocks of inventory may be the dollar difference of the under-delivery. Using the same example from above, instead assume that the actual total audience of "WD" was 18 million viewers. Company X's eCPM was $27.78, meaning they spent more per thousand viewers than they had anticipated. XYZ Network is satisfied since it had already received money upfront, but it now owes $50,000 worth of advertising inventory to company X to capture the remaining 2 million viewers stated in the contract. XYZ Network may offer company X a free 30-second commercial spot at some point in the future during another episode of "WD" or an equivalent show. There are at least two major example problems with this system. First, media buyers do not generally want to wait to receive these "make goods." If a certain episode under-delivers on its ratings, every media buyer that purchased a commercial must be made good. The larger the under-delivery, the more ADUs the media supplier must give out, and the longer the media buyer must wait to receive their "make good." Second, ADUs may create significant operational risk for media suppliers since they are essentially giving away free inventory. Furthermore, ADUs may contain substantial opportunity costs for media suppliers since they must plan their programming schedule around minimizing the impact of this free inventory. For example, XYZ Network may lose out on additional revenue if it had to give away an ADU during a commercial spot that could have sold for $500,000.

In some implementations, delivery process 10 may generate 304 a financial media product based upon, at least in part, the predicted size of delivery of the future media program. Structured media products may be generated from a combination or bundle of various financial media products. The valuation and returns of the structured media products to investors may be based on the payouts of the underlying financial products. For instance, in some implementations, delivery process 10 may address these issues through, e.g., financial products that may offer downside protection or upside participation to both media buyers and/or suppliers. The media buyers and suppliers may purchase bespoke products (generated by delivery process 10), in return for paying a premium, that may be customized to their desired risk. For example, assume that XYZ Network wants to profit from over-delivery during a major sporting event next year (e.g., a single-event product). XYZ Network saw how viewership spiked during a previous year's major sporting event and how it was the first major sporting event to ever go into overtime. XYZ Network, in the example, may pay a premium that may provide a payout to XYZ Network if viewership (actual viewership) is greater than the contractual threshold (predicted viewership). Another example is that XYZ Network wants downside protection on the entire next season of "WD" (e.g., an episodic-event product). Although the show may historically still generate high ratings, total viewership may have been declining over the last several seasons. Instead of paying out ADUs in the case of under-delivery, XYZ Network may prefer to receive cash payouts from the financial media product that it may then give to its media buyers as "make goods." XYZ Network may pay a premium that may provide a payout to XYZ Network if viewership is less than the contractual threshold for each show. Other examples of financial products that may be offered via delivery process 10 may include, but are not limited to:

European-Style Products—payouts are based on the ending metric, e.g., the ratings as of the end of the major sporting event.

Asian-Style Products—payouts are based on the average metric, e.g., the average ratings over the course of an episode of "WD."

American-Style Products—products that may be exercised at any point during the contract term (e.g., a product that allows a digital publisher to exercise its downside protection option during a campaign if a media buyer delays or cancels payment).

Barrier-Style Products—payouts based on the metric being above or below a maximum or minimum metric threshold (e.g., a product that pays out if average, total, or ending viewership is above a certain threshold). In some implementations, the payout "comes into existence" if, and only if, the metric meets or exceeds a maximum or minimum metric threshold (the barrier). For example, a downside protection policy with a payout equal to the difference between the actual viewership and the contractual viewership of 10 million. The policy contains a barrier threshold of 6 million viewers. Therefore, the policy payout may be triggered if, and only if, the level of viewership of the given program is less than or equal to 6 million viewers at any point during the program. For example, if a given sports event was a blowout in the first half and viewership plummeted to 5 million viewers, the barrier-style product would be triggered. Let us assume that the second half of the event was very exciting, and viewership increased to 8 million. The payout is then based on the difference between the actual ending viewership of 8 million and the contract viewership of 10 million. If viewership fell to only 7 million viewers at any point during the program, the barrier would not be triggered, and no payout would be generated by delivery process 10.

Lookback-Style Products—payouts based on the maximum or minimum metric over the course of the contract term (e.g., a product that provides protection against under-delivery with a payout based on the difference between the contractual threshold and the minimum metric level over the course of the contract term).

Basket Products—payouts based on the $n^{th}$ "default" of a certain number of underlying contracts (e.g., a product that pays a claim once the fifth episode of a season under-delivers). While one or more of the above examples of financial products may be used to describe financial derivatives, the policies may be treated as insurance without departing from the scope of the disclosure.

The premiums received from underwriting these financial products may be bundled into any number of structured (media) products and sold to institutional investors. One type of structured product (e.g., structured media product) that may be generated by delivery process 10 may be a media collateralized delivery obligation (mCDO). In this example, the structured product may be tranched by delivery process 10 according to the risk of the underlying financial products and sold to various institutional investors, including hedge funds, pension funds, private equity funds, and endowments. Each tranche may offer a coupon rate based on its risk (e.g., the higher the risk, the higher the coupon rate). Other examples of structured media products that may be generated by delivery process 10 may include, but are not limited to:

Media-Linked Notes (MLNs)—a fixed-income instrument with a coupon rate contingent upon the performance of a basket of media. For example, a bond that pays a coupon of 14% if the average ratings or viewership of "WD" and multiple other events (e.g., TV shows, sporting events, etc.) is within a certain range. The underwriter may have the option to call the notes if the average ratings of the basket exceeded a given threshold, as well as the option to give additional par value should the average ratings of the basket fall below a certain threshold.

$CDO^2$—a CDO that is comprised of the tranches of several other mCDOs (i.e. a bundle of a bundle).

There are no products currently known in the market that provide media delivery downside protection or upside participation, and there are currently no known structured products in the market that are comprised of these media assets.

Thus, the generated financial media products sold to media companies may offer many advantages to both media buyers and media suppliers. For instance, in the case of over-delivery, media suppliers may participate and profit from the upside, whereas they may not under the current industry methodology. In the case of under-delivery, media suppliers may be able to use the claim received to "make good" the media buyer, thereby clearing the liability from their books and reducing their opportunity cost. Media buyers may also purchase these products so they may receive cash payouts immediately instead of waiting for the ADUs from the media suppliers, which they may then quickly redeploy across other types of media to capture additional viewers, ratings, impressions, etc. Both media buyers and media suppliers may purchase downside protection or upside participation products in order to take "bets" on actual viewership, ratings, or impressions or to protect against other contracts.

The structured products (e.g., the mCDOs, media-linked notes, etc.) generated by delivery process 10 and sold to institutional investors may be essentially a new alternative asset class that has little to no correlation with the overall market. Investors may attain competitive yields and instant diversification benefits by including these products in their investment portfolios. Notably, financial products (e.g., the insurance products sold the media buyers and suppliers) are not necessarily the same as the above noted structured products.

In some implementations, delivery process 10 may identify 306 an actual size of delivery, and delivery process 10 may execute 310 an action if the actual size of delivery is less than the predicted size of delivery based upon, at least in part, the financial media product. For instance, and referring at least to the example implementation of FIG. 8, an example downside protection chart 800 is shown. In this example, the media buyer (company X) has purchased a 30-second commercial spot during a major sporting event, which was broadcast by the media supplier (XYZ Network). Company X paid XYZ Network $4 million upfront in return for a guarantee of 113 million viewers, a CPM of $35.40. Since the game was a complete blowout, viewership fell after halftime, causing actual viewership to be 111.5 million. XYZ Network under-delivered by 1.5 million viewers and therefore owed $53,097 worth of advertising back to company X in the form of an ADU:

$$ADU = \max[0, K-\overline{V}] \times CPM \times 1,000$$

Where,
$\overline{V}$=average viewership
K=contractual threshold
CPM=cost per thousand Further assume that company X (e.g., through a media agency) wants to purchase downside protection (e.g., from Isoquant Media (e.g., via delivery process 10)). After buying the 30-second commercial spot from XYZ Network, company X could pay Isoquant Media a premium of $5,310 in return for a cash payout contingent upon under-delivery. Since the broadcast was identified as under-delivered on viewership, company X (e.g., through a media agency) is protected, as instead of waiting to receive an ADU from XYZ Network, company X (e.g., through a media agency) receives the dollar value of the ADU of $53,097 from Isoquant Media (via delivery process 10 executing the action of transferring an asset, such as cash, to company X). The media agency may now either give the cash claim back to its client (e.g., company X if a media agency is used) to improve the company X's marketing ROI or it may redeploy the money across other types of media if the client (company X) wants to try to capture the missing delta in viewership.

In some implementations, delivery process 10 may execute 308 an action if the actual size of delivery is greater than the predicted size of delivery based upon, at least in part, the financial media product. For instance, and referring at least to the example implementation of FIG. 9, an example upside protection chart 900 is shown. In this example, assume the media buyer purchased a 30-second commercial spot during a major sporting event, which was broadcast by the media supplier (XYZ Network). The media buyer paid XYZ Network $4.5 million upfront in return for a guarantee of 113 million viewers, a CPM of $39.82. Since the game had one of the most exciting fourth quarters in history and was decided on the final play, viewership increased throughout the course of the game, finishing at 114.4 million viewers. XYZ Network over-delivered by 1.4 million viewers and therefore missed out on $55,752 worth of advertising revenue, e.g.:

$$\text{Lost Profit} = \max[0, \overline{V} - K] \times CPM \times 1,000$$

Where,
V=average viewership
K=contractual threshold
CPM=cost per thousand

Now assume that XYZ Network wants to purchase upside participation (e.g., from Isoquant Media) and pays Isoquant Media a premium of $5,575 in return for a cash payout contingent upon over-delivery (XYZ Network would purchase the policy any time before the broadcast). Since the broadcast over-delivered on viewership, XYZ Network is protected; instead of having its revenue capped at $4.5 million, XYZ Network receives the dollar value of the over-delivery of $55,752 from Isoquant Media (via delivery process 10 executing the action of transferring an asset, such as cash, to XYZ Network).

Figure 10:
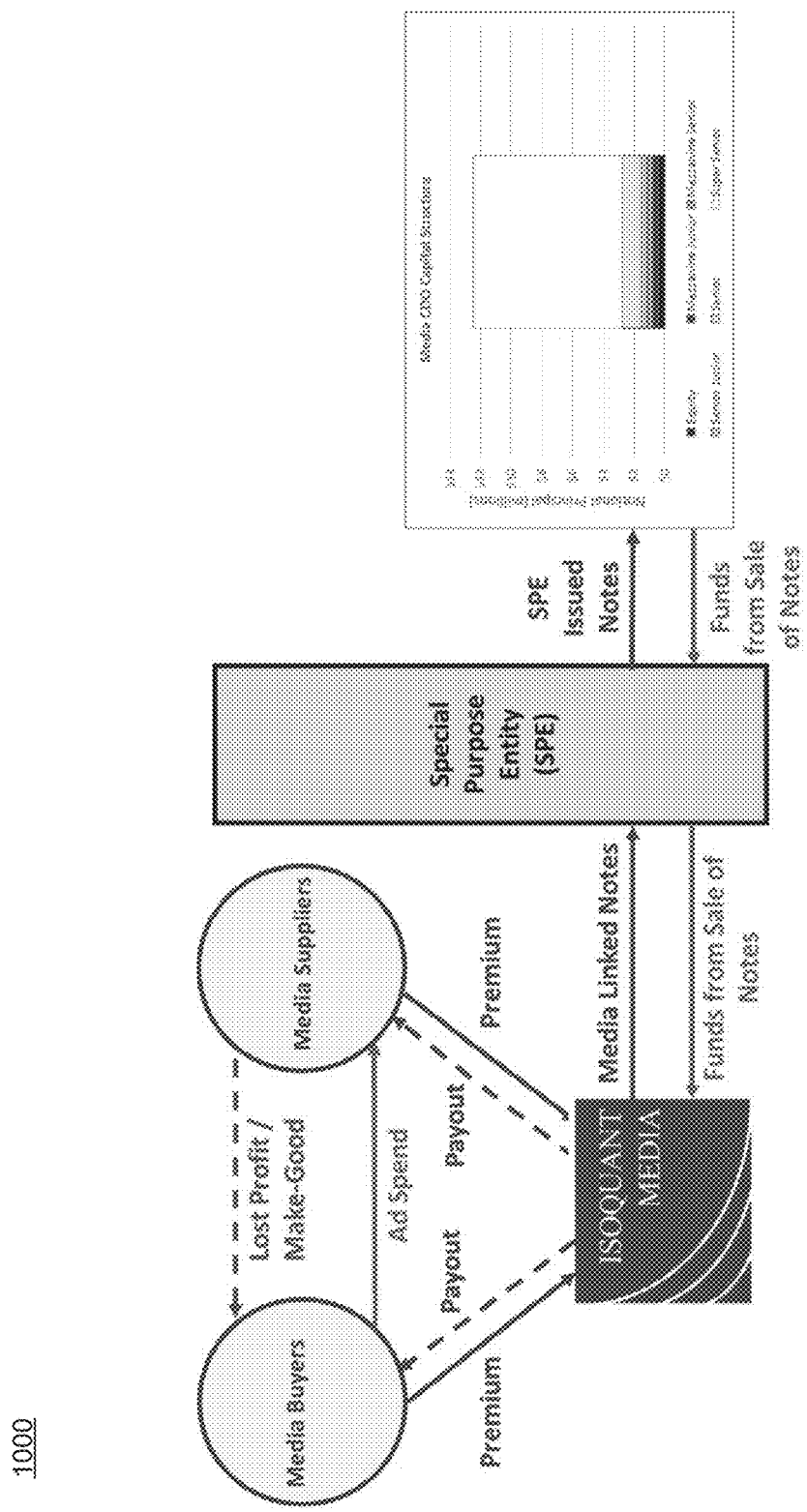
FIG. 10 is an example diagrammatic view of an example structured media product displayed by a delivery process according to one or more example implementations of the disclosure.
Figure 12:
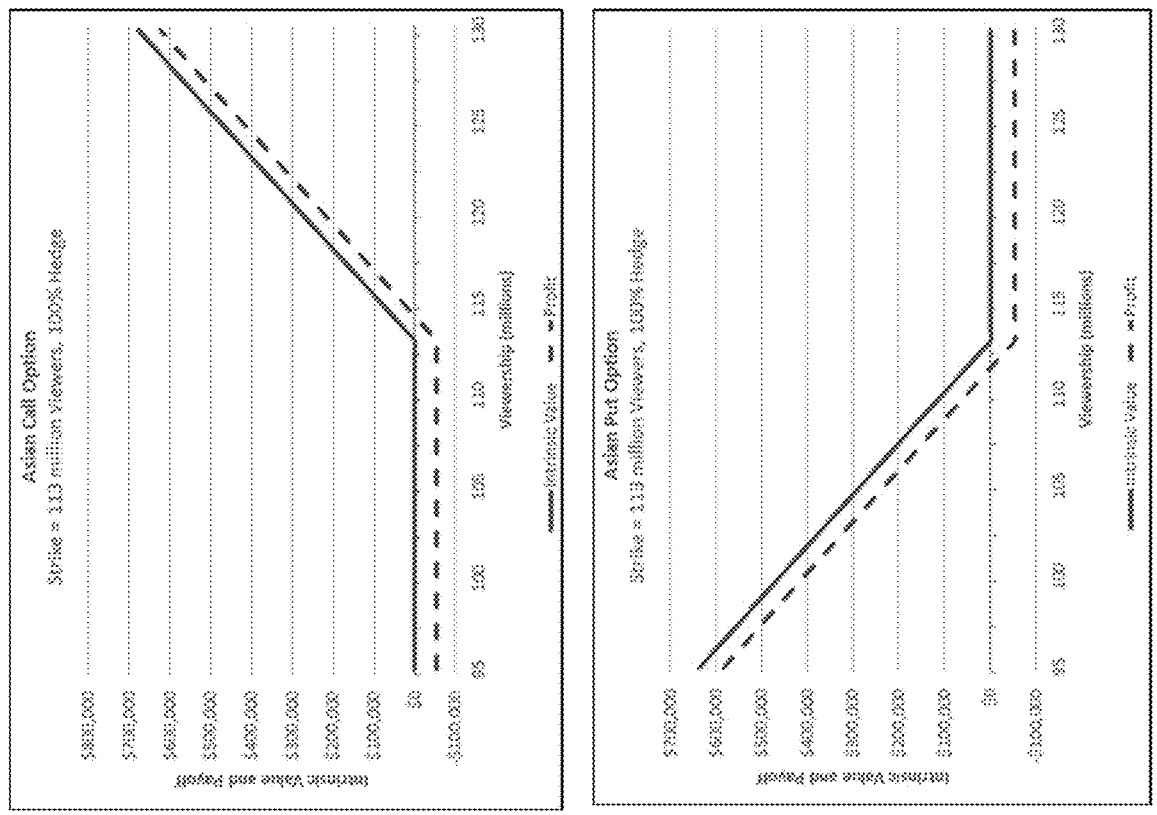
FIG. 12 is an example diagrammatic view of example payoff graphs displayed by a delivery process according to one or more example implementations of the disclosure.

As discussed above, and referring at least to the example implementation of FIG. 10, an example media structured product that may be generated 304 by delivery process 10 is shown in mCDO layout 1000. In the example, the premiums of the unique financial products generated by delivery process 10 for writing downside protection and/or upside participation policies may additionally be bundled into a pool and "sliced" according to risk. Each "slice," or tranche, may have a coupon rate depending on the risk of the tranche. For instance, assume that delivery process 10 enables the selling of, e.g., 100 policies worth, e.g., $1,000 each and pools these policies into an mCDO with a notional value of, e.g., $100,000. Delivery process 10 may determine the size of each tranche by setting the attachment and detachment points, which effectively determines the amount of subordination (i.e., protection) for the senior tranches. For example, assume that the mCDO generated by delivery process 10 contains one or more (e.g., six) tranches, e.g.: Super Senior, Senior, Senior Junior, Mezzanine Senior, Mezzanine Junior, and Equity. The equity tranche may be owned by Isoquant Media and may serve to reduce the adverse selection problem in structured products. Adverse Selection, in this example, may arise if Isoquant Media packages only its highest risk policies into an mCDO to sell to investors. The Equity Tranche in a CDO is the "first loss" tranche. For example, assume that the Equity Tranche has a detachment point of 3%, which means to notional value of the tranche is $3,000. If there are more losses than expected, say $10,000, the equity tranche gets wiped out (along with the next subordinated tranche(s)). Since Isoquant Media is the originator of the generated mCDO (and therefore has more information regarding the quality of the underlying assets than the institutional investors) and retains ownership of the Equity Tranche, this incentivizes Isoquant Media to package quality assets in the structure since it has "skin in the game." This tranche (via delivery process 10) may also absorb the first losses in the structure which provides Isoquant Media with a disincentive to bundle extremely risky financial products. Assume for example purposes only that together, these subordinated tranches have a notional value of, e.g., 25% of the total structure, or $25,000. This indicates that the super senior tranche is protected up until, e.g., $25,000 worth of losses. The greater the losses in a given tranche, the lower the return realized by the investors.

As a more detailed example, assume for example purposes only that delivery process 10 generates and structures an mCDO that includes 125 policies of different TV shows (or other media types), each with a policy premium of $10,000. The total notional value of the mCDO in the example is therefore 125×$10,000=$1,250,000. The mCDO (via delivery process 10) may pay coupons quarterly to investors. Further assume that the contract term of the mCDO is 18 periods, or 4.33 years. Referring at least to the example implementation of FIG. 11, example deal parameters 1100 are shown. In the example, delivery process 10 may determine the attachment and detachment points by, e.g., analyzing the expected loss of the structure, which may be determined by many factors including, e.g., the correlations of claim payouts between the 125 policies, the implied pricing spread on each policy, and interest rates. These factors determine the coupon rates offered on each tranche.

Figure 11:
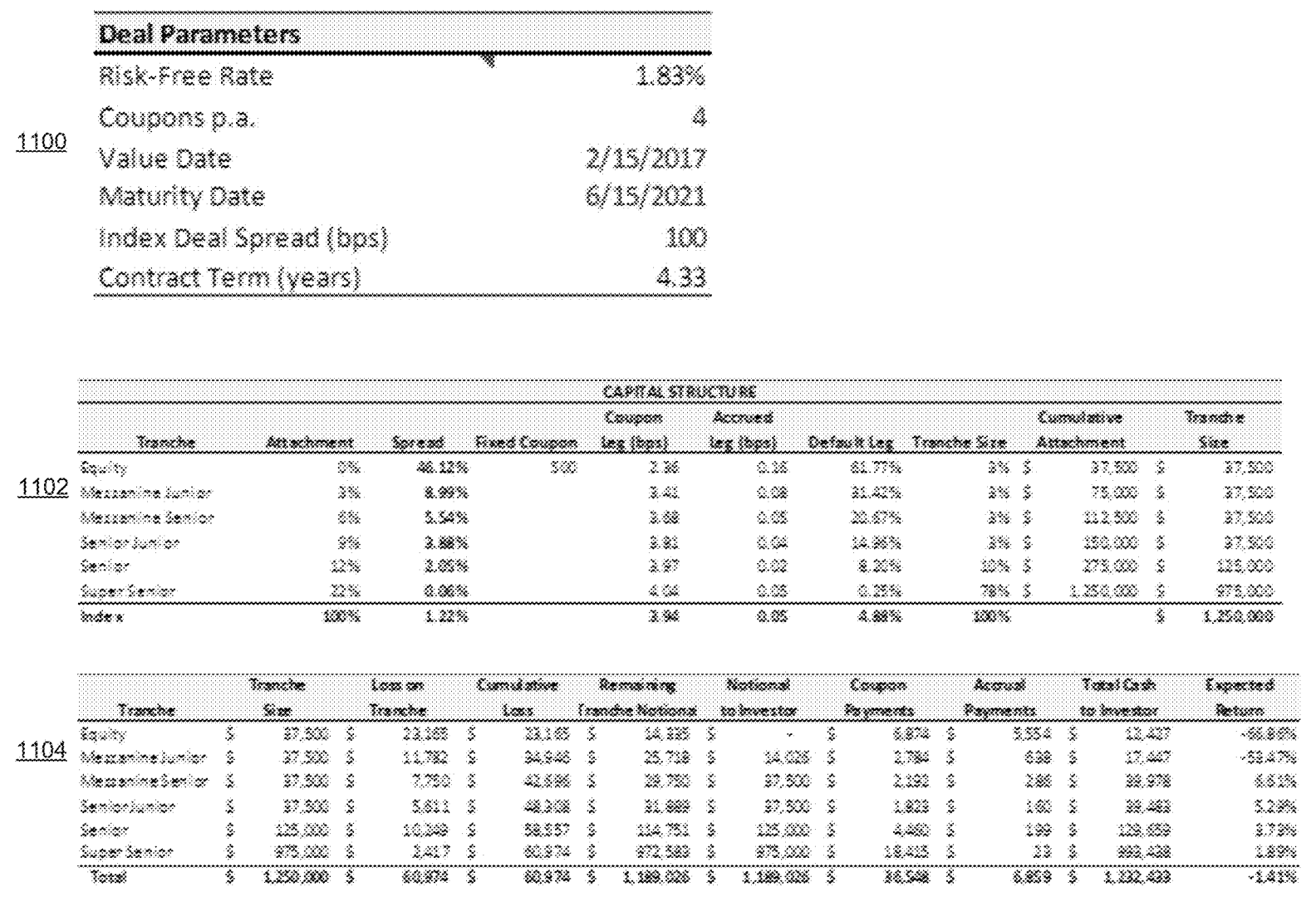

An example of the mCDO capital structure 1102 is be shown in FIG. 11. In the example, delivery process 10 may then run multiple (e.g., thousands) of simulations of this structure to determine, e.g., the expected losses on each tranche, the cumulative loss on the structure, the amount of notional principal owed to the investors, coupon payments, accrued coupon payments, total cash owed to the investors, and expected return.

An example of the mCDO performance 1104 is shown in FIG. 11. In the example, the cumulative loss on the structure is $60,974. Since the Equity tranche notional principal is only $37,500 (a 3% detachment point in this example), those investors have their entire notional value wiped out. However, because the Equity tranche has the greatest risk, it has the highest coupon rate. The coupon rate may be equal to the coupon spread plus the risk-free rate. The Equity tranche coupon rate in the example is therefore 46.12%+1.83%=47.95%. Even though the Equity investors lost their notional principal, they still received $6,874 in coupon payments and $5,554 in accrued coupon payments. The total cash owed to the Equity investors is therefore $12,427 (notional principal+coupon payments+accrued coupon payment).

The payouts of the remaining tranches are calculated accordingly by delivery process 10. Thus, the total losses "waterfall" through the structure. For example, the cumulative loss on the structure is $60,974 and the Equity tranche "absorbed" $37,500 of the losses, leaving $23,474 of losses to be applied to the next subordinated tranche by delivery process 10. The next tranche is the Mezzanine Junior tranche, which also has a notional principal of $37,500 in the example. The remaining notional value of the Mezzanine Junior tranche after the loss is applied in the example is therefore $37,500-$23,474=$14,026. The investors of the Mezzanine Junior tranche lost only part of their notional value. Since they took on less risk, their coupon rate (8.99%+1.83%)=10.82% is lower than that of the Equity tranche.

The remaining tranches do not have their notional principal affected by the cumulative losses since the Equity and Mezzanine Junior tranches had already absorbed the total loss. The total subordination provided by these two tranches in the example is $75,000 and the cumulative loss is $60,974. Thus, the amount of subordination within the structure (e.g., the size of the tranches taking the first-losses) may be used by delivery process 10 to determine the pricing of the mCDO.

In some implementations, the structured media product may be based upon, at least in part, one of a type of media product and a type of event, and in some implementations, the structured media product may be based upon, at least in part, a supplier of the future media program. For example, the media structured products generated by delivery process 10 may be customized according to many different factors. For instance:

Type of Media Products: An mCDO may be structured to include only one type of media or different types of media. The example above illustrated a TV mCDO, where all of the underlying policy payouts in the structure were generated based on TV shows. A mixed mCDO may include policies from two or more types of media. In other words, the structured media product(s) generated may contain, e.g., TV, digital, and radio financial media products (or other media types).

Type of Event: An mCDO may be structured based on a specific event. For example, an mCDO may include only financial media products related to particular sporting event seasons airing on XYZ Network during the 2018-2019 season. As another example, the mCDO may include only financial media products related to College Basketball Championship Tournament games.

By Media Supplier: An mCDO may be structured to include only financial media products from a specific media supplier. For example, an mCDO may include only financial media products related to XYZ Network's shows, or an mCDO may include only financial media products related to a news organization's website digital impressions. It will be appreciated that any combination of the above types may be used to generate the structured media product without departing from the scope of the disclosure.

Type of Payout: an mCDO generated with only downside protection financial media products, only upside participation financial media products, or a combination of downside and upside financial media products.

Time Frame: an mCDO generated with financial media products protecting events that only broadcast on given days of the week, weeks of the years, etc.

In some implementations, structured media products may be issued through a special purpose entity (SPE), a bankruptcy-remote vehicle that is separate from the parent business entity. The SPE (e.g., via delivery process 10) may issue the tranche notes to the investors in return for a fee. The SPE (e.g., via delivery process 10) may take these funds and invest them in a separate fund comprised of short-term, liquid securities to earn interest income before the coupon payments are due. The SPE (e.g., via delivery process 10) may pass on the funds from the sale of the tranche notes back to, e.g., Isoquant Media. This may represent a pure asset sale to Isoquant Media; the potential claims due to the media companies that bought the underlying financial products are paid out of the mCDO tranches, a risk that the mCDO investors have now assumed. Along with the proceeds from the asset sale, Isoquant Media may also receive an origination fee, normally, e.g., 1% to 2% of the total notional value of the structure, which may be paid by the investors.

In some implementations, both the financial and structured products may be between Isoquant Media and the media companies or between Isoquant Media and the structured product investors (or otherwise), which may be implemented entirely in software, hardware, or a combination thereof. In some implementations, a client-facing (frontend) web portal (generated via delivery process 10) may be built and displayed via a client electronic device (e.g., client electronic device 38), that may allow the buyers of the financial and structured products to monitor the value of their positions. For example, the web portal may illustrate a payoff graph (e.g., payoff graphs 1200 and 1202) of the underlying position along with the current profit or loss, as indicated in the example implementation of FIG. 12.

This application may have several different uses; however, the portal may be tied to a proprietary (or non-proprietary) database as well as to the forecast and pricing models executed by delivery process 10. In some implementations, the web portal may have a number of uses. For example, the client-facing portal may enable clients to log-in and view their positions at any time, which may be especially beneficial if a client purchases multiple policies on different events over a given time frame. The portal may also provide the client with a visual and numeric summary of their positions and may be updated with the data from, e.g., the third-party media measurement providers (e.g., Nielsen, Comscore, etc.). As another example, Isoquant Media may use this type of portal internally to summarize its total exposure and other risk metrics.

In some implementations, clients may be able to perform (via delivery process 10) scenario analysis by toggling expected performance of the underlying metric to determine the position's ultimate payout. An example of the scenario analysis input/output screen may be shown in FIG. 7. For example, the web portal may enable delivery process 10 to provide a quote engine where information about the media financial product may be entered, and a quote for the cost may be estimated. For example, the quote engine (via delivery process 10) may ask the user to enter, e.g., the event, the date/time of the event, contract delivery, and advertising campaign cost. This information may then be "pulled" from Isoquant Media's proprietary database for delivery process 10 to generate the expected delivery and variance as well as the loss distribution and target loss ratio. In some implementations, these predictive analytics may be running in the background and not shown to the user. The output that the user may see may include, e.g., the estimated policy premium subject to a certain deductible and limit. The user may then adjust (via delivery process 10) the deductible and limit within reasonable ranges in order to get a sense of how much the premium would increase/decrease depending on the amount of coverage.

Figure 13:
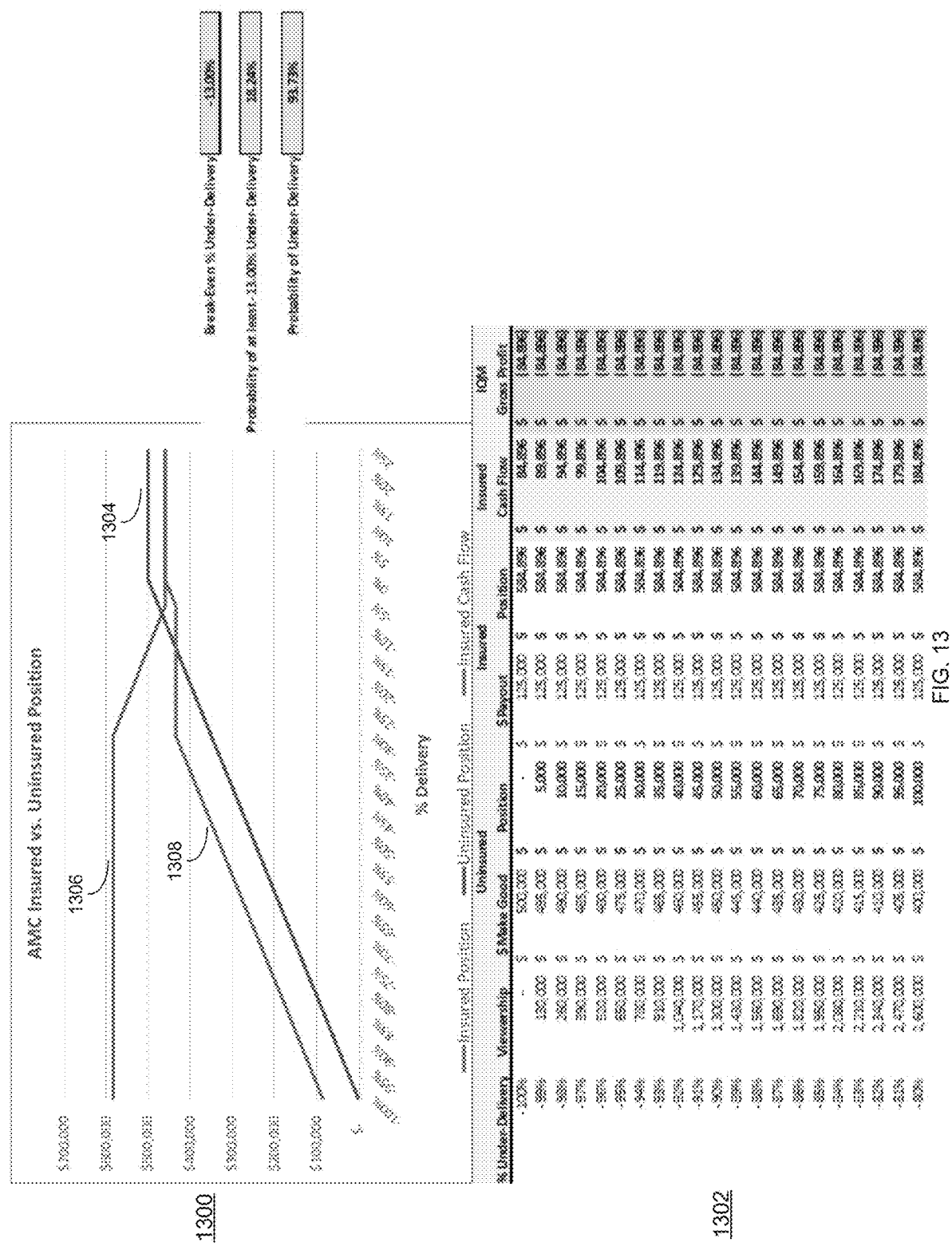
FIG. 13 is an example diagrammatic view of an example client-facing and/or internal portal displayed by a delivery process according to one or more example implementations of the disclosure.

An example of the type of graph 1300 and chart 1302 that would be generated and displayed by delivery process 10 in the client-facing and/or internal portal is shown in example FIG. 13. The line graph in FIG. 13 shows how the financial position of the policy holder is affected by different levels of delivery. It also shows how the financial position is affected by having a downside protection policy versus not having a downside protection policy. For example, the line 1304 shows the uninsured position of a media supplier. As shown, its revenue is capped at $500,000, but "loses" money due to under-delivery since it gives away make goods (column 4 in chart 1302). Line 1306 shows the payout on the downside protection policy subject to the deductible and limit on the policy, which occur at the "kinks" in the line (column 6 in chart 1302). Line 1308 represents the net or combined position, which takes into account the value of the make good, the cost of the premium, and the claim amount received (column 7 in chart 1302). Furthermore, in some implementations, delivery process 10 may include a proprietary mCDO valuation software that may be built and sold to financial institutions and other institutional investors, which may enable clients to generate (via delivery process 10) an mCDO from scratch using data from a proprietary database (or otherwise). For example, the risk and return assumptions of a certain type of show (e.g., regular season football, nightly news, family sitcoms, etc.) may be pulled from the database by delivery process 10, and may allow the financial institution to set the attachment and detachment points and copula assumptions.

In some implementations, delivery process 10 may include structured media software. Since media financial and structured products are not known to currently exist, delivery process 10 may be enabled to price the media structured products. As such, delivery process 10 may be enabled to allow clients (e.g., via the above web portal) to structure and monitor their mCDOs, perform scenario analyses, and maintain tax and regulatory compliance. Thus, a secondary market for these financial and structured products may form. In some implementations, delivery process 10 may include a proprietary trading platform on which these products may be traded (with a commission to every trade cleared), which may also be used to market the financial and structured products to financial institutions. Delivery process 10 may thus include business units that originate media financial and structured products, business units that trade their own risk capital, and business units that make and clear trades for clients.

As noted above, and in some implementations, the above-noted data store may be built such that it includes the following example data source(s):

Fee-Based Data—Nielsen, Comscore/Rentrak, etc.

Company-Specific Data—internal data received from a potential client.

Weather Data—data sets from the National Weather Service, Accuweather, etc.

Social Media Data—Facebook, Twitter, Instagram, SnapChat, LinkedIn, etc. and any social media platforms that may provide (or not provide) open API capability.

Economic Data—data sets from central banks, financial institutions, public markets, etc. It will be appreciated that any combination of the above data may be used to help predict the delivery for a given media event.

In some implementations, rather than acting as a principal and underwrite the financial products, delivery process 10 may include the ability to serve as an agent or broker to the media companies and "match" policies between two or more counterparties. For example, let us assume that XYZ Network and ZYX Network want to enter into a swap contract in which XYZ Network pays ZYX Network the dollar value of the expected delivery of TV show 1 in return for ZYX Network paying XYZ Network the dollar value of the expected delivery of "WD." Thus, delivery process 10 may broker this contract and may collect a spread on the notional value of the payments that transfer between the counterparties.

For example, delivery process 10 may include the ability to search for those transactions that may be included in a given swap transaction, which could then be proposed to the counterparties (e.g., via the above-noted web portal). The above-noted web portal may also be used to enable one or more counterparties to contact Isoquant Media (or other company) looking for one or more other counterparties to enter into a swap transaction.

In some implementations, delivery process 10 may include a media risk data store that may be used to provide "credit-like" ratings. For example, TV show 1 on XYZ Network may not have been expected to be a huge hit when it first aired. Based on equivalent shows and historical data, delivery process 10 may determine and assign TV show 1 with media risk rating of, e.g., BBB. However, once it became clear that the show was a hit, delivery process 10 may upgrade the ratings to, e.g., AAA. For example, AAA would be the lowest risk/highest quality rating and D would be the highest risk/lowest quality rating. Therefore, a consistently highly rated show with low viewership volatility such as TV Show 2 may have a AAA rating whereas a low-rated show that is in danger of being canceled may have a D rating. Standardizing media risk ratings may have many applications in structured media products. Many structured credit products such as CDOs have weighted average rating factor (WARF) provisions in the structure agreement. The WARF may dictate the overall quality of financial products that may be included in the structure. For example, a WARF of 350 may "map" to a credit rating of BBB. If the given CDO structure mandates that the WARF must be at least 350, any credit instrument with a credit risk rating below BBB generally could not be added.

In some implementations, delivery process 10 may use the risk data to provide risk consulting services back to the media companies. For example, delivery process 10 may use the risk data to advise media buyers and suppliers on the pricing of their advertising campaigns, which may be determined based upon, at least in part, the media risk rating of the underlying event.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, event specific data of a past media program and event specific data of a future media program, wherein the event specific data of the future media program includes social media activity for the future media program;

predicting a size of delivery of the future media program based upon, at least in part, the event specific data of the past media program and the social media activity for the future media program obtained via web scraping executed using a scripting language, wherein the predicted size of delivery of the future media program is a number of viewers predicted to view the future media program, wherein predicting the size of delivery of the future media program includes:

generating one or more quantitative time-series models, wherein the one or more quantitative time-series models includes a machine learning model;

training the one or more quantitative time-series models using the event specific data layered onto a base model to classify the base model according to the event specific data; and iteratively back-testing the one or more quantitative time-series models using the event specific data of the past media program and the social media activity for the future media program pulled at different intervals as input to generate a best model fit;

generating a financial media product based upon, at least in part, the predicted size of delivery of the future media program, wherein generating the financial media product includes combining a plurality of financial media products and tranching the plurality of financial media products according to expected values on each tranch, wherein the expected values on the each tranch is determined based upon, at least in part, the iterative back-testing of the one or more quantitative time-series models using the event specific data of the past media program and the social media activity for the future media program;

issuing the financial media product through a bankruptcy-remote vehicle and passing funds from a sale of tranch notes of plurality of media products to a first business entity;

identifying an actual size of delivery, wherein the actual size of delivery is a number of viewers that actually viewed the future media program;

executing a first action if the number of viewers that actually viewed the future media program is greater than the number of viewers predicted to view the future media program based upon, at least in part, the financial media product, wherein the first action includes transferring a financial asset from a first business entity to a second business entity if the number of viewers that actually viewed the future media program is greater than the number of viewers predicted to view the future media program, wherein an amount of the financial asset for the first action is determined based upon, at least in part, the best model fit generated from the back-testing of the one or more quantitative time-series models using the event specific data pulled at different intervals as the input; and executing a second action if the number of viewers that actually viewed the future media program is less than the number of viewers predicted to view the future media program based upon, at least in part, the financial media product, wherein the second action includes transferring a financial asset from the first business entity to a third business entity if the number of viewers that actually viewed the future media program is less than the number of viewers predicted to view the future media program, wherein an amount of the financial asset for the second action is determined based upon, at least in part, the best model fit generated from the back-testing of the one or more quantitative time-series models using the event specific data pulled at different intervals as the input, wherein the second business entity and the third business entity are different business entities.

2. The computer-implemented method of claim 1 wherein identifying includes obtaining at least a portion of the event specific data via an internal data feed.

3. The computer-implemented method of claim 1 wherein the second business entity is a media buyer and the third business entity is a media supplying.

4. The computer-implemented method of claim 1 wherein a frontend web portal enables displaying the financial media product.

5. The computer-implemented method of claim 1 wherein the financial media product is based upon, at least in part, one of a type of media product and a type of event.

6. The computer-implemented method of claim 1 wherein the financial media product is based upon, at least in part, a supplier of the future media program.

7. The computer-implemented method of claim 1 wherein identifying includes obtaining at least a portion of the event specific data via web scraping executed using a scripting language.

8. A computer program product residing on a non-transitory computer readable storage medium having a plurality of instructions stored thereon which, when executed across one or more processors, causes at least a portion of the one or more processors to perform operations comprising:

identifying, by a computing device, event specific data of a past media program and event specific data of a future media program, wherein the event specific data of the future media program includes social media activity for the future media program;

predicting a size of delivery of the future media program based upon, at least in part, the event specific data of the past media program and the social media activity for the future media program obtained via web scraping executed using a scripting language, wherein the predicted size of delivery of the future media program is a number of viewers predicted to view the future media program, wherein predicting the size of delivery of the future media program includes:

generating one or more quantitative time-series models, wherein the one or more quantitative time-series models includes a machine learning model;

training the one or more quantitative time-series models using the event specific data layered onto a base model to classify the base model according to the event specific data; and iteratively back-testing the one or more quantitative time-series models using the event specific data of the past media program and the social media activity for the future media program pulled at different intervals as input to generate a best model fit;

generating a financial media product based upon, at least in part, the predicted size of delivery of the future media program, wherein generating the financial media product includes combining a plurality of financial media products and tranching the plurality of financial media products according to expected values on each tranch, wherein the expected values on the each tranch is determined based upon, at least in part, the iterative back-testing of the one or more quantitative time-series models using the event specific data of the past media program and the social media activity for the future media program;

issuing the financial media product through a bankruptcy-remote vehicle and passing funds from a sale of tranch notes of plurality of media products to a first business entity;

identifying an actual size of delivery, wherein the actual size of delivery is a number of viewers that actually viewed the future media program;

executing a first action if the number of viewers that actually viewed the future media program is greater than the number of viewers predicted to view the future media program based upon, at least in part, the financial media product, wherein the first action includes transferring a financial asset from a first business entity to a second business entity if the number of viewers that actually viewed the future media program is greater than the number of viewers predicted to view the future media program, wherein an amount of the financial asset for the first action is determined based upon, at least in part, the best model fit generated from the back-testing of the one or more quantitative time-series models using the event specific data pulled at different intervals as the input; and executing a second action if the number of viewers that actually viewed the future media program is less than the number of viewers predicted to view the future media program based upon, at least in part, the financial media product, wherein the second action includes transferring a financial asset from the first business entity to a third business entity if the number of viewers that actually viewed the future media program is less than the number of viewers predicted to view the future media program, wherein an amount of the financial asset for the second action is determined based upon, at least in part, the best model fit generated from the back-testing of the one or more quantitative time-series models using the event specific data pulled at different intervals as the input, wherein the second business entity and the third business entity are different business entities.

9. The computer program product of claim 8 wherein identifying includes obtaining at least a portion of the event specific data via an internal data feed.

10. The computer program product of claim 8 wherein the second business entity is a media buyer and the third business entity is a media supplying.

11. The computer program product of claim 8 wherein a frontend web portal enables displaying the financial media product.

12. The computer program product of claim 8 wherein the financial media product is based upon, at least in part, one of a type of media product and a type of event.

13. The computer program product of claim 8 wherein the financial media product is based upon, at least in part, a supplier of the future media program.

14. The computer program product of claim 8 wherein identifying includes obtaining at least a portion of the event specific data via web scraping executed using a scripting language.

15. A computing system including one or more processors and one or more memories configured to perform operations comprising:

identifying, by a computing device, event specific data of a past media program and event specific data of a future media program, wherein the event specific data of the future media program includes social media activity for the future media program;

predicting a size of delivery of the future media program based upon, at least in part, the event specific data of the past media program and the social media activity for the future media program obtained via web scraping executed using a scripting language, wherein the predicted size of delivery of the future media program is a number of viewers predicted to view the future media program, wherein predicting the size of delivery of the future media program includes:

generating one or more quantitative time-series models, wherein the one or more quantitative time-series models includes a machine learning model;

training the one or more quantitative time-series models using the event specific data layered onto a base model to classify the base model according to the event specific data; and iteratively back-testing the one or more quantitative time-series models using the event specific data of the past media program and the social media activity for the future media program pulled at different intervals as input to generate a best model fit;

generating a financial media product based upon, at least in part, the predicted size of delivery of the future media program, wherein generating the financial media product includes combining a plurality of financial media products and tranching the plurality of financial media products according to expected values on each tranch, wherein the expected values on the each tranch is determined based upon, at least in part, the iterative back-testing of the one or more quantitative time-series models using the event specific data of the past media program and the social media activity for the future media program;

issuing the financial media product through a bankruptcy-remote vehicle and passing funds from a sale of tranch notes of plurality of media products to a first business entity;

identifying an actual size of delivery, wherein the actual size of delivery is a number of viewers that actually viewed the future media program;

executing a first action if the number of viewers that actually viewed the future media program is greater than the number of viewers predicted to view the future media program based upon, at least in part, the financial media product, wherein the first action includes transferring a financial asset from a first business entity to a second business entity if the number of viewers that actually viewed the future media program is greater than the number of viewers predicted to view the future media program, wherein an amount of the financial asset for the first action is determined based upon, at least in part, the best model fit generated from the back-testing of the one or more quantitative time-series models using the event specific data pulled at different intervals as the input; and executing a second action if the number of viewers that actually viewed the future media program is less than the number of viewers predicted to view the future media program based upon, at least in part, the financial media product, wherein the second action includes transferring a financial asset from the first business entity to a third business entity if the number of viewers that actually viewed the future media program is less than the number of viewers predicted to view the future media program, wherein an amount of the financial asset for the second action is determined based upon, at least in part, the best model fit generated from the back-testing of the one or more quantitative time-series models using the event specific data pulled at different intervals as the input, wherein the second business entity and the third business entity are different business entities.

16. The computing system of claim 15 wherein identifying includes obtaining at least a portion of the event specific data via an internal data feed.

17. The computing system of claim 15 wherein the second business entity is a media buyer and the third business entity is a media supplying.

18. The computing system of claim 15 wherein a frontend web portal enables displaying the financial media product.

19. The computing system of claim 15 wherein the financial media product is based upon, at least in part, one of a type of media product, a type of event, and a supplier of the future media program.

20. The computing system of claim 15 wherein identifying includes obtaining at least a portion of the event specific data via web scraping executed using a scripting language.

* * * * *